(12) United States Patent
Lang et al.

(10) Patent No.: US 8,380,740 B2
(45) Date of Patent: Feb. 19, 2013

(54) SELECTIVE STORING OF MINING MODELS FOR ENABLING INTERACTIVE DATA MINING

(75) Inventors: Alexander Lang, Stuttgart (DE); Bernhard Mitschang, Boblingen (DE); Ruben Pulido de los Reyes, Stuggart (DE); Christoph Sieb, Schoenaich (DE); Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 12/951,542

(22) Filed: Nov. 22, 2010

(65) Prior Publication Data
US 2011/0153664 A1 Jun. 23, 2011

(30) Foreign Application Priority Data
Dec. 22, 2009 (EP) .................................. 09180322

(51) Int. Cl.
*G06F 7/00* (2006.01)
(52) U.S. Cl. ..................................................... 707/776
(58) Field of Classification Search ............... 707/776
See application file for complete search history.

(56) References Cited

U.S. PATENT DOCUMENTS

| | | | |
|---|---|---|---|
| 6,820,089 B2 | 11/2004 | Vishnubhotla | |
| 7,370,316 B2 | 5/2008 | Kraiss et al. | |
| 7,512,623 B2 | 3/2009 | Apps et al. | |
| 2003/0212678 A1* | 11/2003 | Bloom et al. | 707/6 |
| 2003/0212855 A1* | 11/2003 | Sakaguchi et al. | 711/113 |
| 2004/0010505 A1 | 1/2004 | Vishnubhotla | |
| 2005/0102303 A1 | 5/2005 | Russell et al. | |
| 2007/0214135 A1* | 9/2007 | Crivat et al. | 707/6 |
| 2008/0077544 A1* | 3/2008 | Sureka | 706/13 |
| 2009/0094174 A1 | 4/2009 | Kussmaul | |
| 2009/0144276 A1 | 6/2009 | Russell et al. | |

OTHER PUBLICATIONS

T. Morzy et al., "Fast Discovery of Sequential Patterns Using Materialized Data Mining Views", In: International Symposium on Computer and Information Sciences, 2000.
B. Nag et al., "Caching for Multi-Dimensional Data Mining Queries", Proceedings of the 2001 SCI Conference, 2001.
S. Dar et al., "Semantic Data Caching and Replacement", Proceedings of the Third International Conference on Information and Knowledge Management, 1994.

(Continued)

*Primary Examiner* — Jensen Hu
(74) *Attorney, Agent, or Firm* — Susan Murray; SVL IP Law Edell, Shapiro & Finnan, LLC

(57) ABSTRACT

Computerized methods, data processing systems, and computer program products for storing of data mining models (DMMs) are provided. A new DMM is created having at least one of the following characteristics: quality and complexity. The new DMM is handled as a candidate for storing in a storage device if a predefined criterion for the characteristics is met. The sum of the sizes of the new DMM and already stored DMMs is determined. In response to the sum falling below a storage limit, the new DMM is stored in the storage device. In response to the sum exceeding the storage limit, a decision is taken based on priorities of the DMMs which DMMs to store in the storage device. The priorities depend at least on access frequencies of the DMMs. Upon a data mining request, a corresponding DMM is determined and a user is requested to confirm that data mining is to proceed if quality of the determined DMM does not fulfill a further predefined criterion.

17 Claims, 11 Drawing Sheets

OTHER PUBLICATIONS

"CRoss Industry Standard Process for Data Mining" http://www.crisp-dm.org/.

M.J. Carey, M.J. Franklin, M. Livny, E.J. Shekita: "Data Caching Tradeoffs in Client-Server DBMS Architectures", SIGMOD, Rec. 20, 2. 1991.

Y. Arens, C.A. Knoblock, "Intelligent Caching: Selecting, Representing, and Reusing data in an Information Server", In Proceedings of the Third International Conference on Information and Knowledge Management, 1994.

B. Czejdo, M. Morzy, M. Wojciecowski, M. zakrzewicz, "Materialized Views in Data Mining", Database and Expert Systems Applications, 2002.

F. Bonchi, F. Giannotti, G. Manco, C. Resno, M. Nanni, D. Pedreschi, S. Ruggieri, "Data Mining for Intelligent Web Caching", International Conference on Information Technology: Coding and Computing, 2001.

* cited by examiner

| Request Id | R1A | R1B | R2 | R3A | R3B |
|---|---|---|---|---|---|
| Mining Type | Association Rules | Association Rules | Association Rules | Association Rules | Association Rules |
| Data Selection Constraint | Table= DEFECTS Filter= Munich | Table= DEFECTS Filter= Munich | Table= DEFECTS Filter= Stuttgart | Table= DEFECTS Filter= Berlin | Table= DEFECTS Filter= Berlin |
| Mining Constraint | MinSupp= 10% | MinSupp= 20% | MinSupp= 10% | MinSupp= 10% | MinSupp= 20% |

810

| Task Id | T0 | T1 | T2 | T3 |
|---|---|---|---|---|
| Mining Type | Clustering | Association Rules | Association Rules | Association Rules |
| Data Selection Constraint | Table= CUST Filter= All | Table= DEFECTS Filter= Munich | Table= DEFECTS Filter= Stuttgart | Table= DEFECTS Filter= Berlin |
| Mining Constraint | MaxNum=5 | MinSupp= 10% | MinSupp= 10% | MinSupp= 10% |

820

| Model Id | M0 | M1 | M2 | M3 |
|---|---|---|---|---|
| Quality | 90% | 76% | 40% | 61% |
| Build Time | 20 min | 15 min | 12 min | 18 min |
| Access | 5 | 1, 2 | 1 | 1, 2 |
| Size | 5 MB | 2 MB | 5 MB | 3 MB |
| Priority | 5 * 5 MB = 25 | 1 * 2 MB = 2<br>2 * 2 MB = 4 | 1 * 5 MB = 5 | 1 * 3 MB = 3<br>2 * 3 MB = 6 |

| Step | Materialize for Model Id | | | |
|---|---|---|---|---|
| | M0 | M1 | M2 | M3 |
| 911 | YES | - | - | - |
| 912 | YES | YES | - | - |
| 913 | YES | YES | NO | - |
| 914 | YES | YES | NO | MAYBE |
| 915 | YES | MAYBE | NO | YES |

| Model | Rule for defect parts | Support | Confidence |
|---|---|---|---|
| Rule 1 | Cylinder head gasket -> ignition plug | 24% | 68% |
| Rule 2 | Steering shaft -> Steering skew gear | 23% | 83% |
| Rule 3 | Wheel suspension -> Axel box | 11% | 77% |
| Quality | | | Average: 76% |

SELECTIVE STORING OF MINING MODELS FOR ENABLING INTERACTIVE DATA MINING

BACKGROUND

1. Technical Field

The present invention relates to computerized methods, data processing systems, and computer program products for storing of data mining models.

2. Discussion of the Related Art

Data mining refers in general to data-driven approaches for extracting hidden information from input data. The extracted information depends on a type of data mining and is put together in data mining models. This model information can be further analyzed or verified against further process information.

Data mining techniques typically need to consider how to effectively process large amounts of data. Consider manufacturing of products as an example. There, the input data may include various pieces of data relating to origin and features of components. The aim of data mining in the context of manufacturing may be to resolve problems relating to quality analysis and quality assurance. Data mining may be used, for example, for root cause analysis, for early warning systems within the manufacture plant, and for reducing warranty claims. As a second example, consider various information technology systems. There, data mining may further be used for intrusion detection, system monitoring, and problem analyses. Data mining has also various other uses, for example, in retail and services, where typical customer behavior can be analyzed, and in medicine and life sciences for finding causal relations in clinical studies.

Three discovery methods of data mining are clustering, association rules, and sequences. Clustering data mining seeks to find distinct clusters or groups of data records having similar attributes. The records of one cluster should be homogeneous, and the records of two different clusters should be as heterogeneous as possible. Association rules are patterns describing which items occur frequently within transactions. Sequences data mining finds typical time-ordered sequences of items in given input data.

Traditional data mining scenarios assume that a single user designs and executes a data mining task once or few times. Iterative data mining processes such as the Cross Industry Standard Process for Data Mining (CRISP-DM) process have been designed for such scenarios. These processes are usually performed offline as a background task. However, many current and future data mining scenarios show rather different characteristics. First, data mining is not a planned task, but is rather invoked ad hoc in the course of an interactive analytical process. And second, data mining is invoked by many different users in parallel on the same datasets with partially overlapping tasks.

Interactive data mining puts much higher demands on response times than offline data mining. This is a serious problem especially in the cases where the datasets that are analyzed are rather large. If each user invokes data mining independently of each other, many resources may be wasted.

One way to address this problem is to use a general purpose caching algorithm for data mining models. Thus, if a data mining model is built, it is not only returned to the user who issued a query, but also stored in a cache. Such a cache would then allow several users to share the same model. If a model was already built by another user, it does not need to be rebuilt again later on. However, users can specify a broad variety of parameters and storage space is limited to store all built data mining models.

In the field of databases, semantic caches were developed, which are aware of how queries are related to each other and exploit this information to allow for a more intelligent caching strategy. These database query caches are not suitable to support caching of data mining models.

In the field of association rule data mining, there are known techniques of caching. For example, a chunk-based cache can be provided that stores the results of association rule mining queries along with semantic information. However, this method is limited to itemsets.

Other methods are known for mapping new data mining queries onto existing materialized, that is, cached, data mining views of previous data mining queries. These approaches are also limited to association rule mining.

The existing approaches do not address the questions which models should be cached and how a further reduction of response times can be effectively realized.

BRIEF SUMMARY

The present invention provides a computerized method, a data processing system, and a computer program product for storing of data mining models for further use in face of limited storage space.

In an example embodiment of the present invention, a computer-implemented method for storing of data mining models comprises creating a first data mining model having at least one of the characteristics of quality and complexity, determining whether the first data mining model is a candidate for storing in a storage means or storage device in response to a criterion for the characteristics being met, determining whether the sum of the size of the first data mining model and sizes of further data mining models already stored in the storage means exceeds a storage limit, in response to the storage limit not being exceeded, storing the first data mining model in the storage means, and in response to the storage limit being exceeded, determining, based upon priorities of the first data mining model and the further data mining models, which data mining models to store in the storage means, the priorities being dependent at least on access frequencies of the respective data mining models.

There may be provided a surjective (N-to-1) mapping from data mining requests onto data mining tasks and a bijective (1-to-1) mapping from data mining tasks onto data mining models. A data mining task may have an associated data mining model. For each stored data mining model, a respective task description may be stored. Upon receiving a new data mining request, a determination may be performed based on the surjective and bijective mappings whether a data mining model associated with the new data mining request is already stored in the storage means.

Post-processing of the data mining model associated with the new data mining request may be performed. For the first data mining model, information identifying the first data mining model and information describing the first data mining model characteristics may be stored even if the first data mining model is not stored for further use. A data mining model may comprise a set of data patterns. A data pattern may have an associated pattern property determined by the data mining task. The data mining quality of the data mining model may be calculated based on the pattern properties. The data mining model complexity may be determined based on a build time of the data mining model. A priority of a data mining model may be calculated based at least on one of the following characteristics: access frequency, storage size, build time, and quality. From the storage means, already stored data mining models may be removed based at least on their priorities. The surjective mapping may comprise comparing data mining requests and data mining tasks based on data selection constraints and data mining constraints.

Another example of the present invention provides a computer-implemented method for storing of data mining models comprising the following steps. For data mining models, information identifying a data mining model and information describing data mining model quality is stored in storage means. Data mining models having data mining model quality fulfilling a first predefined criterion are stored in the storage means. Upon receiving a new data mining request, a data mining model is determined for the new data mining request and checking is performed when information describing data mining model quality for the data mining model has been stored in the storage means. A user is requested to confirm that data mining is to proceed if data mining model quality of the data mining model does not fulfill a second predefined criterion.

A data mining model may comprise a set of data patterns. A data pattern may have an associated pattern property determined by the data mining task. The data mining quality of the data mining model may be calculated based on the pattern properties.

A further example embodiment of the present invention comprises a data processing system for storing of data mining models. The system comprises storage means for storing data mining models and data processor or data processing means. The data processing means creates a first data mining model, which has at least one of the following characteristics: quality and complexity. The data processing means determines whether the first data mining model is a candidate for storing in the storage means if a criterion for the characteristics is met. The data processing means determines whether the sum of the size of the first data mining model and the sizes of further data mining models already stored in the storage means exceeds a storage limit When the storage limit is not exceeded, the data processing means stores the first data mining model in the storage means. When the storage limit is exceeded, the data processing means decides, based upon priorities of the first data mining model and the further data mining models, which data mining models to store in the storage means. The priorities are dependent at least on access frequencies of the respective data mining models.

A still further example embodiment of the present invention comprises a data processing system for storing of data mining models. The system comprises a storage device or storage means, an input device or input means, a data processor or data processing means, and an output device or output means. The storage means stores for data mining models information identifying a data mining model and information describing data mining model quality, and the storage means stores data mining models. The input means receives a new data mining request. The data processing means stores in the storage means the information identifying a data mining model and the information describing data mining model quality. The data processing means stores in the storage means data mining models having data mining model quality fulfilling a first predefined criterion. The data processing means determines a data mining model for the new data mining request and determines whether information describing data mining model quality for the data mining model has been stored in the storage means. The data processing means initiates a request to a user to confirm that data mining is to proceed when data mining model quality of the data mining model does not fulfill a second predefined criterion. The output means submits the request to the user.

Another example embodiment of the present invention comprises a computer program product for storing of data mining models. The computer program product comprises a computer usable medium having computer usable program code embodied therewith. The computer usable program code is configured to perform the processing steps of creating a first data mining model having at least one of the characteristics of quality and complexity, determining whether the first data mining model is a candidate for storing in storage means in response to a criterion for the characteristics being met, determining whether the sum of the size of the first data mining model and sizes of further data mining models already stored in the storage means exceeds a storage limit, in response to the storage limit not being exceeded, storing the first data mining model in the storage means, and in response to the storage limit being exceeded, determining, based upon priorities of the first data mining model and the further data mining models, which data mining models to store in the storage means, the priorities being dependent at least on access frequencies of the respective data mining models.

An additional example embodiment of the present invention comprises a computer program product for storing of data mining models. The computer program product comprises a computer usable medium having computer usable program code embodied therewith. The computer usable program code is configured to store in storage means for data mining models information identifying a data mining model and information describing data mining model quality, store in the storage means data mining models having data mining model quality fulfilling a first predefined criterion, upon receiving a new data mining request, determine a data mining model for the new data mining request and determine whether information describing data mining model quality for the data mining model has been stored in the storage means, and request a user to confirm that data mining is to proceed in response to a determination that data mining model quality of the data mining model does not fulfill a second predefined criterion.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE DRAWINGS

FIGS. 8 to 10 illustrate a sample scenario for storing of association rule data mining models according to an embodiment of the present invention.

DETAILED DESCRIPTION

A data mining model is calculated based on a data mining task. A data mining task description specifies a data mining type, data selection constraints for data on which data mining is to be applied, and data mining constraints which depend on the data mining type. A data mining request is the actual invocation of a data mining task by a user. The request comprises parameters for a surjective many-to-one (N-to-1) mapping onto a corresponding data mining task. This surjective mapping allows different data mining requests to be associated with the same data mining task even if the requests and tasks have different data mining constraints and other different parameters. A bijective one-to-one (1-to-1) mapping associates a data mining task with a data mining model. The mappings may be performed based on program code portions and configuration parameters. A semantic cache in accordance with embodiments of the present invention takes data mining model characteristics into account for selectively storing the data mining models. Caching or materialization means storing data mining models information for further use in portions of transient memory or in portions of a persistent storage device, for example, a hard disk. When the cached information is requested a second time, it can be faster returned to the user because the data mining model information does not have to be re-computed. The percentage of user requests that can be directly responded from information stored in the cache is called cache hit rate. When data mining models are requested, the contents of the cache are dynamically updated based on re-computed priorities, which are calculated based at least on access frequencies of the data mining models. This allows for short response times for difficult to compute and frequently used data mining models and does not consume unnecessarily much storage space in the memory or in other storage devices.

Figure 1:
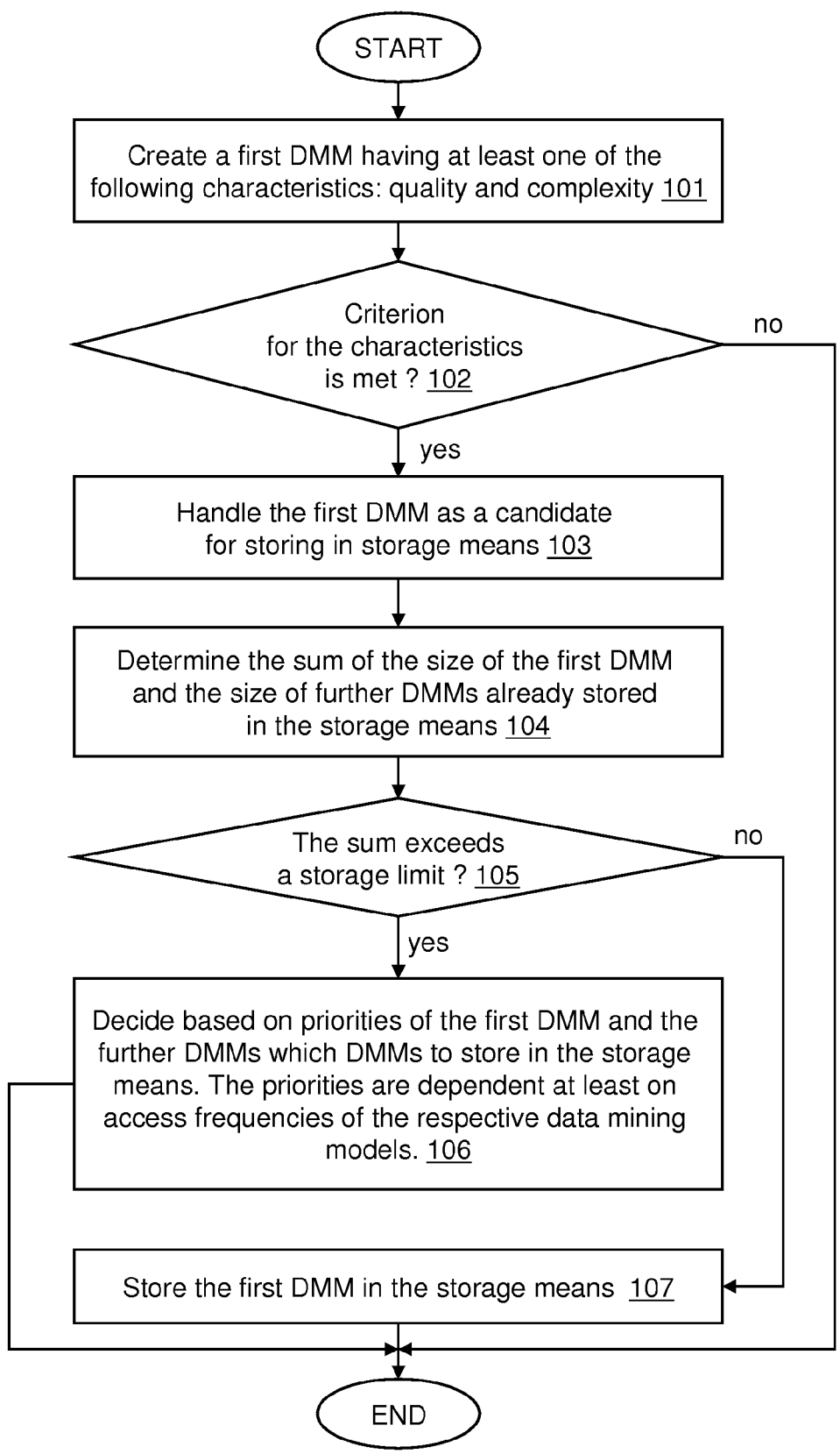
FIG. 1 illustrates a flow chart of a first method for storing of data mining models according to an embodiment of the present invention.

FIG. 1 illustrates a flow chart of a first example method for storing of data mining models. It is noted that, in FIG. 1 and also the other figures, the term DM refers to data mining and the term DMM refers to data mining model. In step 101, a first data mining model is created, which has at least one of the following characteristics: quality and complexity. In step 102, a test is performed to determine whether a criterion for the characteristics is met. If no, processing ends. If yes, the first data mining model is handled as a candidate for storing in a storage means or storage device in step 103. In step 104, the sum of the size of the first data mining model and the size of further data mining models already stored in the storage means is determined In step 105, a test is performed if this sum exceeds a pre-defined storage limit If the storage limit is not exceeded, the first data mining model is stored in the storage means in step 107. If the storage limit is exceeded, a decision is taken based on priorities of the first data mining model and the further data mining models which data mining models to store in the storage means in step 106. The priorities are dependent at least on access frequencies of the respective data mining models.

Figure 2:
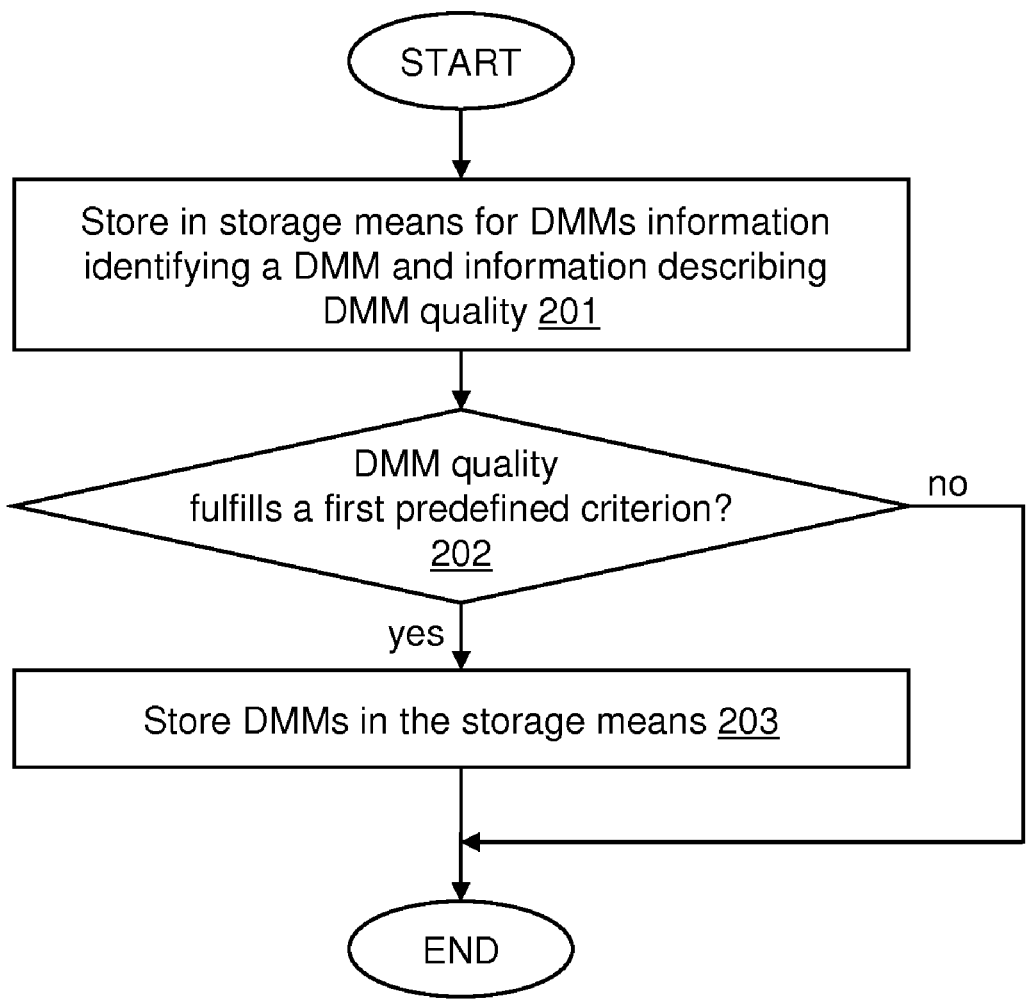
FIGS. 2 and 3 illustrate flow charts of a second method for storing of data mining models according to an embodiment of the present invention.

FIG. 2 illustrates a first flow chart of a second example method for storing of data mining models. In the second method, as illustrated by step 201, information identifying a data mining model and information describing data mining model quality are stored in storage means for previously created data mining models. As illustrated by step 202, the previously created data mining models are tested if their data mining model qualities fulfill a first predefined criterion. If yes, these previously created data mining models are stored in the storage means, as illustrated by step 203. Otherwise, they are not stored.

Figure 3:
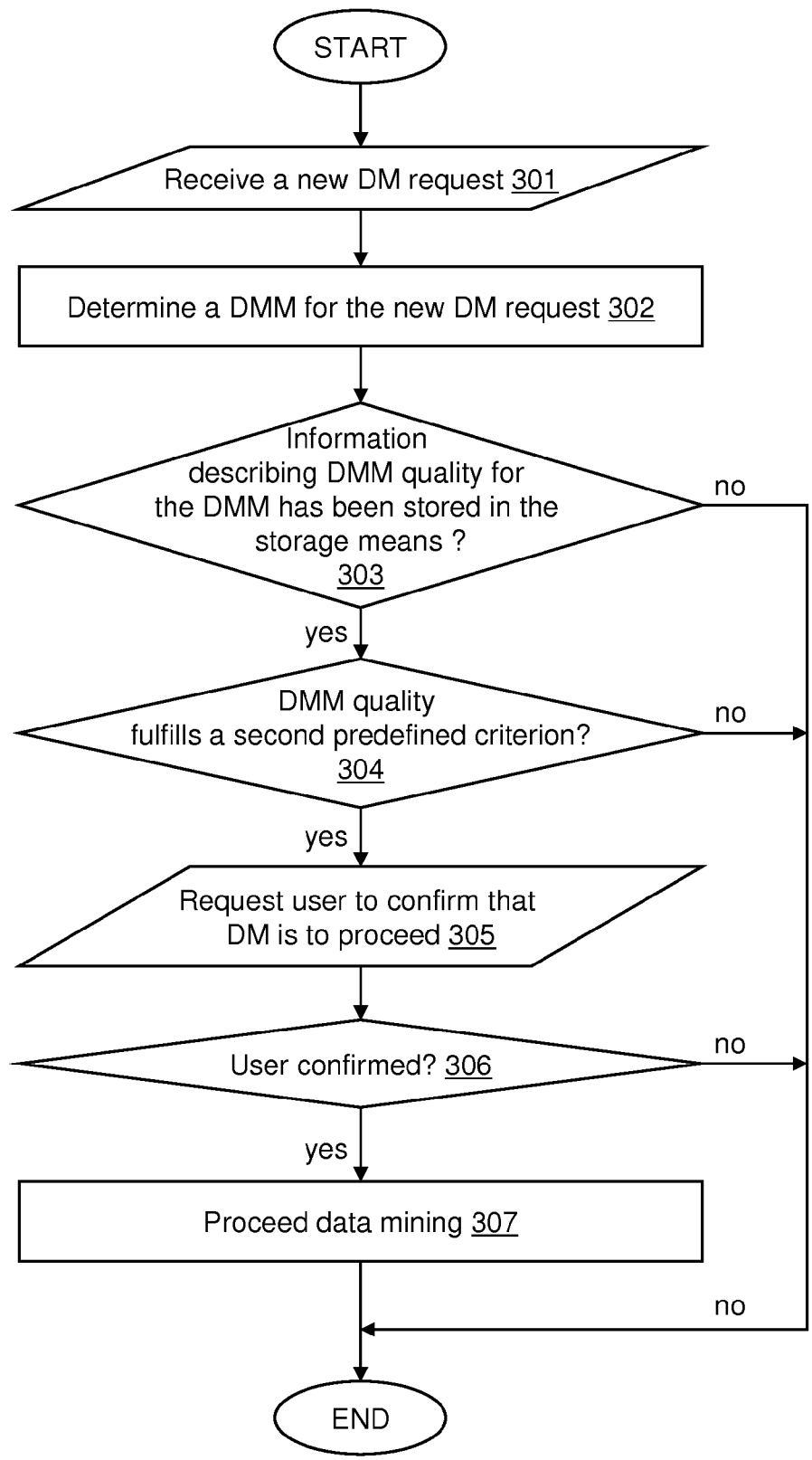

FIG. 3 illustrates a second flow chart of the second example method for storing of data mining models. A new data mining request is received in step 301. A data mining model for the new data mining request is determined in step 302. Step 303 checks if information describing data mining model quality for this data mining model has already been stored in the storage means in step 201 of FIG. 2. If the check of step 303 fails, processing ends for the new data mining request. If the check of step 303 is successful, step 304 tests if the data mining model quality fulfills a second predefined criterion. If the test of step 304 fails, the new data mining request is not further processed. If the test of step 304 is successful, a user is requested in step 305 to confirm that data mining is to proceed. If the user confirms in step 306, data mining proceeds for the new data mining request in step 307. Otherwise, processing on this data mining request is not continued.

Figure 4:
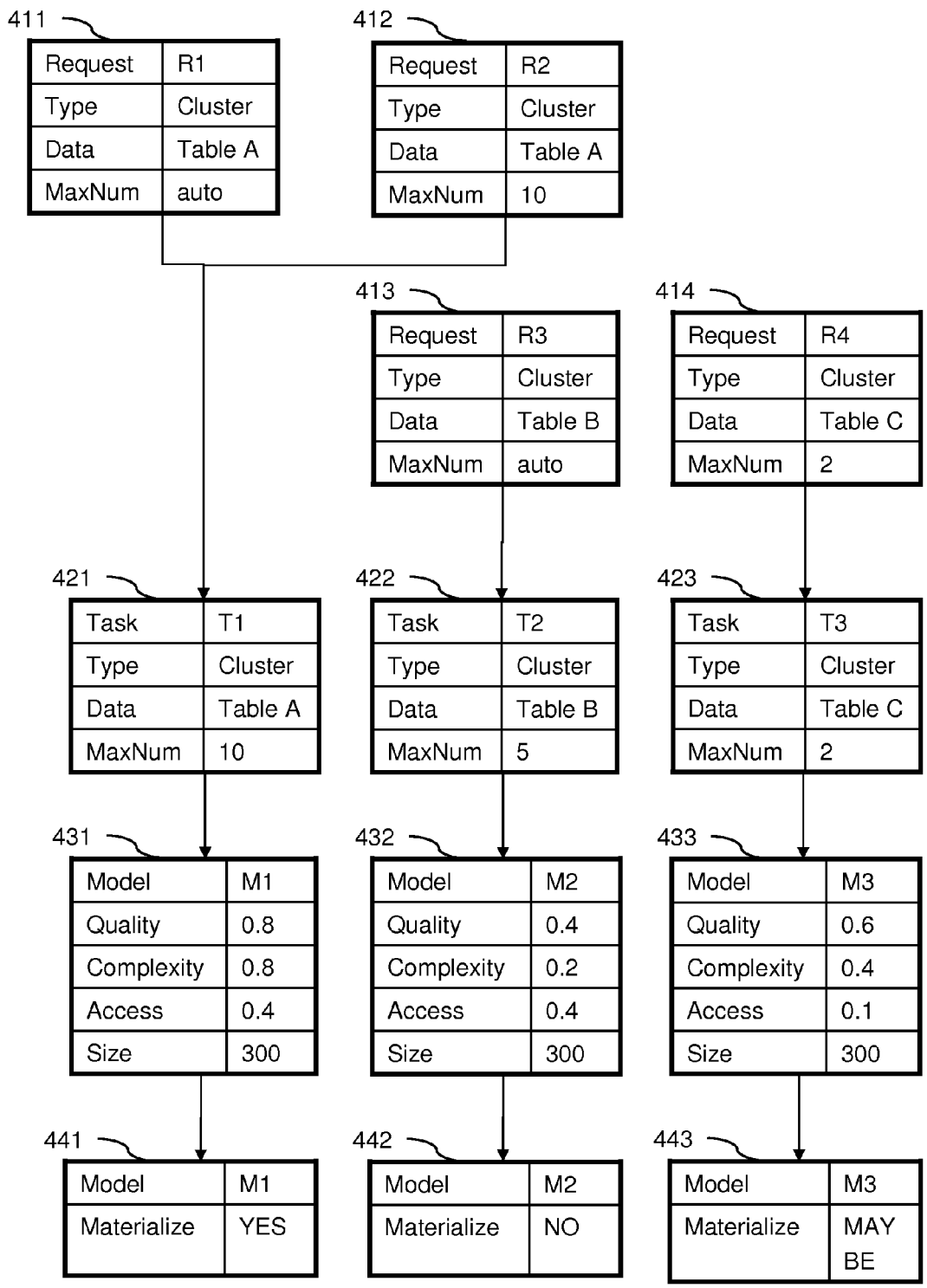
FIG. 4 illustrates an example for storing of clustering data mining models according to an embodiment of the present invention.

FIG. 4 illustrates an example for storing of clustering data mining models. The example comprises four data mining requests 411, 412, 413, and 414, with respective identifiers R1, R2, R3, and R4. The data mining type is always Cluster. Each request specifies data selection on one of the tables A, B, and C. The surjective mapping procedure copies the data mining type and the data selection constraints from the data mining request to a corresponding data mining task, which is one of the data mining tasks, 421, 422, and 423, with respective identifiers T1, T2, and T3. The data mining constraints of the request are mapped onto the data mining constraints of the task as follows: A user may specify a maximum number of clusters for a data mining model calculation, for example, MaxNum=10 in the data mining request 412 and MaxNum=2 in the data mining request 414. A data mining request may be mapped onto an already existing data mining task with the same or a higher maximum number MaxNum of clusters. When the user does not specify the maximum number of clusters, for example, MaxNum=auto in the data mining requests 411 and 413, the clustering data mining system tries to map such requests to already stored data mining tasks with same data mining type and data selection constraints. If this is not possible, a new task description with a predefined value for MaxNum is stored. Then, the data mining system creates the data mining model associated with the data mining task.

A first user submits a data mining request 411 to cluster data of a table A without specifying a maximum number of clusters, for example, MaxNum=auto. Assume that the data mining system maps the first request 411 with identifier R1 onto a new data mining task T1, sets the maximum number of clusters for the data mining task T1 to a predefined value of MaxNum=10 and computes the associated data mining model M1. A second request 412 with identifier R2 specifies the same table A and the value MaxNum=10 or lower. The data mining system is aware that the automatically determined parameter was actually evaluated to MaxNum=10. Then, the second request would be mapped onto the same data mining task T1. Instead of computing a new data mining model for the second request R2, the cached data mining model M1 can be returned to the user.

Any clustering data mining request that has the same data selection constraints as a data mining task T1 and specifies an equal or lower MaxNum value than the data mining task T1 may be mapped onto the data mining task T1. Therefore, this data mining task T1 may be considered as an equivalent or more general data mining task description that yields the data mining model M1. If a clustering data mining request R5 has a lower MaxNum value than the actual number of clusters in the data mining model M1 and the data mining request R5 has been mapped onto the data mining task T1, post-processing is needed to compute a data mining model M1A. The post-processing comprises aggregating some of the clusters contained in the data mining model M1 until M1A contains exactly the number of clusters specified in the data mining request R5. If a clustering data mining request R6 has a higher MaxNum value than an existing data mining task T1 with the same data selection constraints, a mapping of the data mining request R6 may be impossible. Then, a new data mining task T6 is created with the requested MaxNum value and an associated data mining model M6 is built.

In a new data mining request 413 with identifier R3, the maximum number of clusters is not specified, that is, MaxNum=auto. The new request R3 is mapped onto a new data mining task 422 with identifier T2. This data mining task is independent from the task T1 because the data selection is based on a different table B. The maximum number of clusters of the data mining task 422 is set to a predefined value, MaxNum=5. An associated data mining model M2 is created, which has 5 or fewer clusters.

A further new data mining request 414 with identifier R4 specifies data selection on table C. This request is mapped onto a new data mining task 423 with identifier T3. This task is independent from the tasks T1 and T2 because data mining is performed on another table C. The request 414 with identifier R4 specifies a maximum number of clusters, MaxNum=2, and is mapped onto the task 423 with identifier T3 with the same maximum number of clusters, MaxNum=2. When the data mining model M3 associated with the data mining task 423 is built, it may have fewer clusters than the maximum number of clusters, MaxNum=2, specified in data mining task T3.

The execution of each data mining task, T1, T2, T3, results in an associated data mining model, M1, M2, M3. Each data mining model has a set of data mining model characteristics, 431, 432, 433, which comprise information about quality, complexity, access count or access frequency, and storage size of the data mining model. All characteristics are measurable, that is, they are expressed in terms of numerical values.

compute the data mining model on the fly. The access count or access frequency is a fraction of hits of the data mining model that occur in a time window. The storage size is an amount of storage that the data mining model consumes in the cache. The cache can be implemented as transient memory or as persistent storage, for example, a hard disk.

Instead of having real measured values for any of the four data mining model characteristics, corresponding values may also be estimated based on other properties, such as details from the data mining task. This estimation may provide an estimated data mining model quality, an estimated data mining model complexity, an estimated access count or an estimated access frequency, and an estimated data mining model size. The determined data mining model characteristics are stored in the cache independent of the decisions on storing the complete information of the data mining model.

Based on the data mining model characteristics, a materialization criterion may be evaluated. Materialization means storing a complete data mining model for further use. The evaluation results in a materialization state for each data mining model. The materialization state variable may have one of three values:

1. "Materialize=YES" indicates that a calculated data mining model should be stored in the cache if the data mining model quality is not too low and the build time of the data mining model is not too short and if a storage limit of the cache is not exceeded.

2. "Materialize=NO" indicates that a calculated data mining model should not be stored in the cache if the data mining model quality is too low or the build time of the data mining model is too short.

3. "Materialize=MAYBE" indicates that a data mining model should not be stored after a computation for a first data mining request even when the data mining model quality is not too low and the build time is not too short because the storage limit of the cache is exceeded. At subsequent requests, the data mining model may be re-computed and eventually stored in the cache when the cache has sufficient free storage space.

The materialization criterion may be expressed using the following formula:

```
IF ( ModelQuality < MinimumQuality OR ModelComplexity < MinimumComplexity )
    Materialize = NO
ELSEIF ( CacheStorageLimitNotExceeded )
    Materialize = YES
ELSE
    Materialize = MAYBE
ENDIF
```

Multiple data mining methods are known, such as for example, demographic clustering and Kohonen neural clustering. Both methods result in clustering models, where each model comprises a discrete number of clusters. The clustering model may contain a model quality number Q in the range [0 . . . 1]. The model quality number Q of the Demographic Clustering model is the overall homogeneity of the clusters, where the homogeneity of a cluster is a mean similarity between two records of the cluster. In the case of the Kohonen Clustering, the model quality number is the overall homogeneity of the clusters as measured by the mean distance between data records of the cluster and the best matching cluster center.

The data mining model complexity is determined based on a build time of the data mining model. This is the time to In the case of the following threshold values (namely MinimumQuality=0.5 and MinimumComplexity=0.3), the calculation of the materialization state 442 returns Materialize=NO for the model M2 because its quality is lower than the first threshold and its complexity is lower than the second threshold. The second reason means that the model build time is smaller than a minimum build time. Since the data mining model can be computed easily on the fly, the model M2 for the task T2 is not materialized.

The materialization states 441 and 443 for the respective models M1 and M3 are Materialize=YES and MAYBE. This depends on whether the storage limit for the cache is already exceeded or not. Therefore, the model M1 for the task T1 is materialized because it has a higher quality and complexity than the predefined thresholds and the cache storage limit is not yet exceeded. The model M3 for the task T3 may also be materialized in the future when its access frequency increases. When the materialization state of a model is set to YES or MAYBE, the model is given a priority, which may typically depend on the storage size of the data mining model size and its access count.

Figure 5:
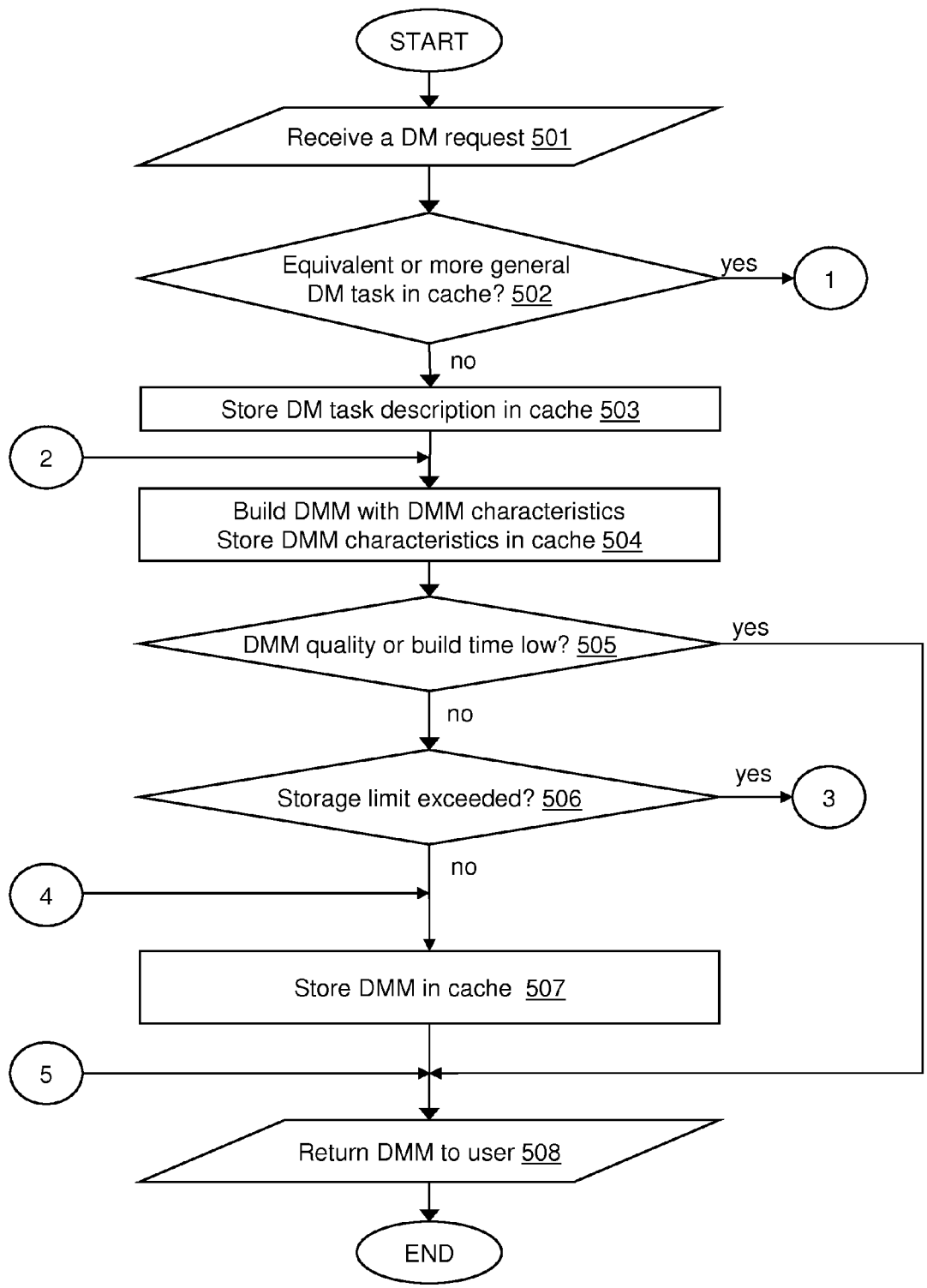
FIGS. 5 to 7 illustrate flow charts describing selective and interactive storing of data mining models according to an embodiment of the present invention.
Figure 6:
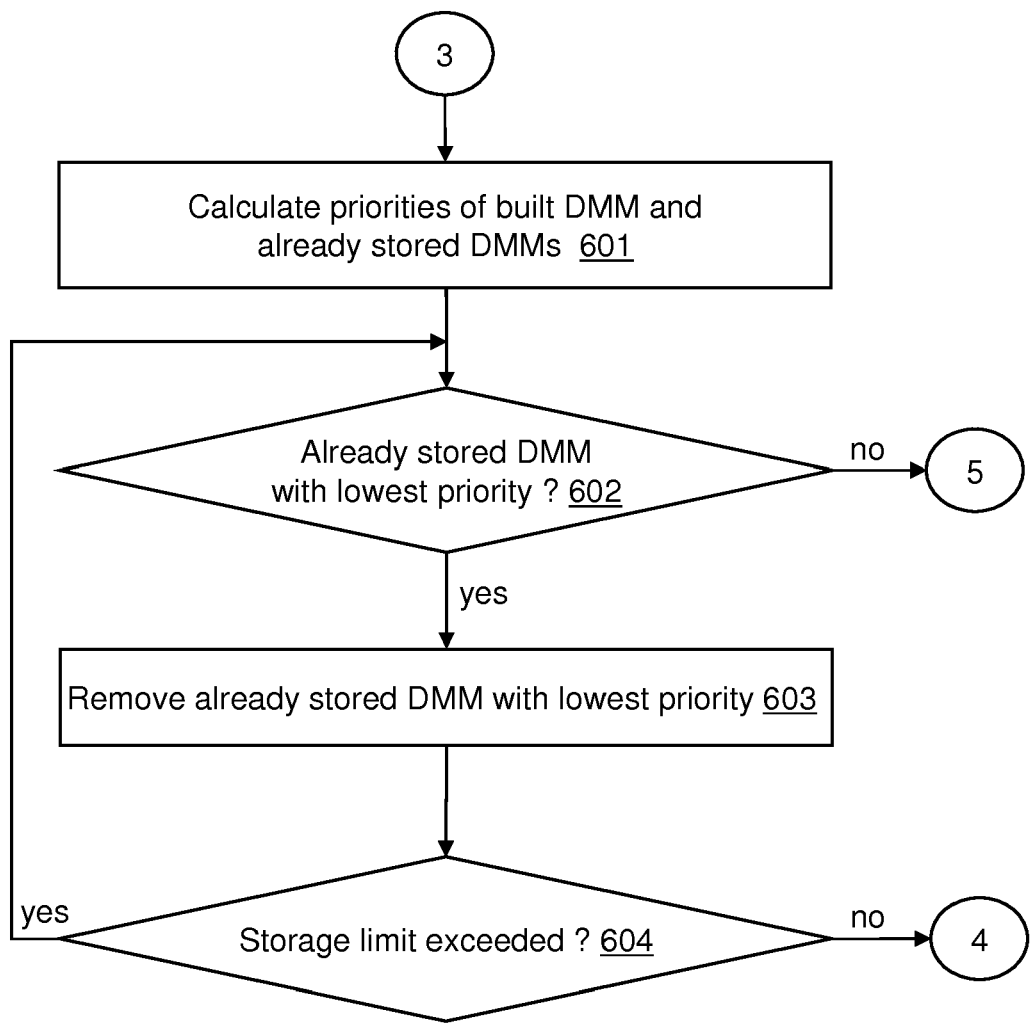
Figure 7:
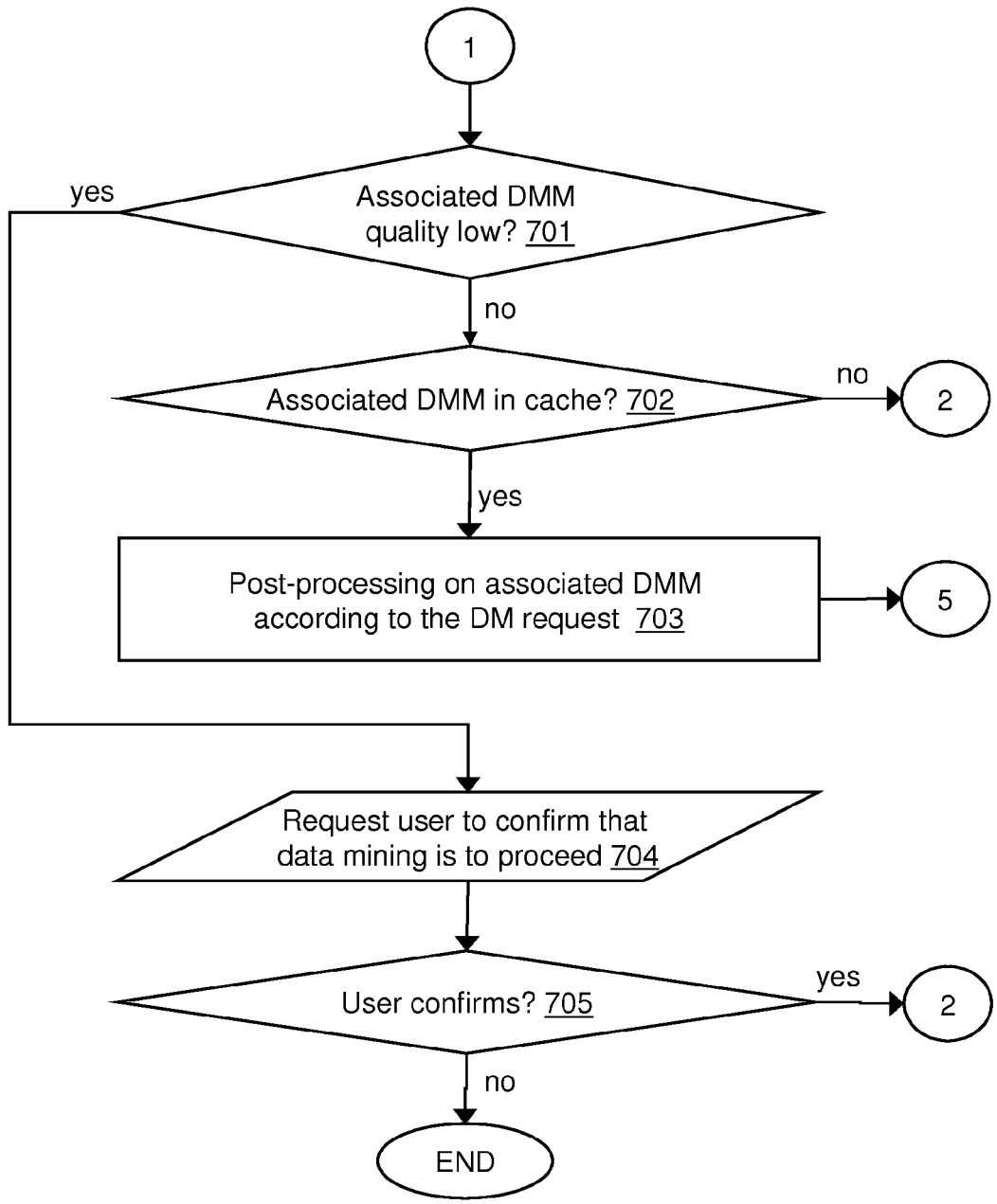

FIGS. 5 to 7 illustrate flow charts describing selective and interactive storing of data mining models. These flow charts are interlinked by connector elements 1, 2, 3, 4, and 5.

When the data mining system is used a first time, an administrator user may specify several data mining tasks that are considered to be relevant for many users and cannot be computed on the fly. The data mining system checks if these data mining tasks fulfill the materialization criterion for pre-computation of the associated data mining models and for storing them in the cache.

As illustrated in FIG. 5, in step 501, the data mining system receives a data mining request. In step 502, the data mining system checks if a data mining task that is equivalent to the received data mining request or a more general data mining task than the received data mining request are stored in the cache. In the second case, the received data mining request is more specific or more restricted than the cached data mining task. Constraints of data mining requests and data mining tasks are represented as conjunctions of parameters. The parameters may be literals that only contain simple binary relations. For example, DataSource="Table A" AND MaxNum="10". Then, the step 502 can be performed very efficiently by simple logical entailment. A surjective mapping from such data mining requests onto data mining tasks, that is, a many-to-one mapping, is a binary relation among a set of requests and a set of tasks. The preferred embodiment employs two mechanisms to actually determine this relation: The first mechanism is applied when a parameter is not specified in the request description, for example, MaxNum=auto. The data mining system automatically determines this unspecified parameter for the data mining task, for example, MaxNum=10. The second mechanism makes use of a subsumption relation between different constraints. When a request fulfills more specific constraints, it can be mapped onto a task having more general constraints. For example, a data mining request with a data mining constraint MaxNum=2 can be mapped onto a data mining task with a data mining constraint MaxNum=10, because the second constraint is more general than the first one. When the data mining request has been successfully mapped onto an existing data mining task, processing continues via connection element 1 in FIG. 7.

If for the received data mining request no suitable data mining task can be found in the cache in step 502, the data mining system may store in step 503 in the cache parameters of the received data mining request as a task description. The mapping between the task description and the data mining model to be built is bijective, that is, a one-to-one mapping. Then, in step 504, the data mining system builds the data mining model with corresponding data mining model characteristics and may store the data mining model characteristics in the cache. The data mining system may update the corresponding task description with information from the data mining model. If the corresponding data mining model characteristics are already stored in the cache, they may be updated. The data mining model characteristics may comprise a model identifier, information about model quality, storage size, access count and build time. Data mining task descriptions and data mining model characteristics can be stored in the cache for data mining models that themselves are not stored in the cache.

In step 505, the data mining system checks if the data mining model quality is lower than a predefined minimum quality or if the build time is lower than a predefined minimum build time. If yes, the built data mining model will not be materialized and the process continues at step 508. When the result of step 505 is "no", the data mining system determines the sum of the size of the built data mining model and the sizes of further data mining models already stored in the cache and tests if this sum exceeds a predefined storage limit This means that the cache would run out of storage space if the built data mining model was stored. When the storage limit is not exceeded, the data mining system stores the built data mining model in the cache in step 507. In step 508, the built data mining model is returned to the user, which is independent from storing the data mining model in the cache or not. If the storage limit is exceeded in step 506, processing continues via connection element 3 in FIG. 6.

In FIG. 6, processing enters via connection element 3 from FIG. 5. In step 601, the data mining system calculates priorities of the built data mining model and the already stored data mining models. A data mining priority may be determined based at least on one of the following characteristics: the storage size of a data mining model, its access count or access frequency, its build time or its computation time, and its quality. The data mining priority may be the product of the storage size and the access count of the data mining model. The access count is a number of user requests to provide the corresponding data mining model, which may be divided by a total number of user requests. The access count or access frequency measurement is typically limited to a time window. Preferably, the built data mining model gets an access frequency value of one.

In step 602, the data mining system tests if already stored data mining models have lowest priorities. If no, the built data mining model has lowest priority and the data mining system decides not to store it in the cache. Processing continues via connection element 5 in FIG. 5. The built data mining model is returned to the user in step 508. When an already stored data mining model has lowest priority, this model is removed from the cache in step 603. Again, the data mining system tests in step 604 whether the sum of the size of the built data mining model and sizes of the already stored data mining models exceeds the predefined storage limit. If yes, processing continues at step 602 to test if an already stored data mining model has lowest priority. If the storage limit is not exceeded any more, the process goes via connection element 4 to step 507 in FIG. 5 to store the built data mining model in the cache.

In step 502 of FIG. 5, when a data mining task is found in the cache that is equivalent to the data mining request or that is more general than the data mining request, the data mining system continues processing via connection element 1 in FIG. 7. The data mining system tests in step 701 whether the data mining model quality of the associated data mining model is lower than a minimum quality threshold. If the quality is too low, the data mining system issues a warning to a user in step 704 and requests the user to confirm that data mining is to proceed. In step 705, the user may decide not to use the model, and the processing of the data mining request is terminated. When the user confirms to proceed data mining in step 705, the data mining system continues via connection element 2. Back in FIG. 5, in step 504, the data mining system builds the data mining model associated with the data mining task determined in step 502. When the data mining quality is higher than the minimum quality threshold in step 701, the data mining system tests in step 702 if the associated data mining model is stored in the cache. If no, the data mining system continues via the connection element 2 at step 504 in FIG. 5 and builds the associated data mining model. If the associated data mining model is stored in the cache, the data mining system may perform post-processing on the associated data mining model in step 703. When the corresponding data mining task is equivalent to the data mining request, no post-processing may be required, and the cached data mining model can be directly returned to the user in step 508 in FIG. 5. When the corresponding data mining task is more general than the data mining request, a sub-model may be created from the cached data mining model according to the data mining request. Via connection element 5, this sub-model may be returned to the user in step 508 in FIG. 5.

The creation of the sub-model may depend on the data mining type. In the case of clustering data mining, the number of clusters may be reduced by aggregation of existing clusters of a cached data mining model. For association rule mining, a detailed example is described below.

When the data set on which data mining is performed essentially changes, all data mining models based on the changed data set are removed from the cache. However, information about access count and quality may still be kept in the cache. These properties are expected to be dependent of the nature of the data mining method applied on the selected data itself. The storage size and build time of the data mining model, however, should grow with the amount of data taken into account.

FIGS. 8 to 10 illustrate a sample scenario for storing of association rule data mining models. Association rules are patterns describing which items occur frequently within transactions. Consider a set of items $I=\{I_1, I_2, \ldots I_m\}$. Let D be a set of transactions, where each transaction T is a subset of items belonging to I. A transaction T may contain a subset $A=\{I_1, I_2, \ldots I_p\}$ of items in I and may also contain a further subset $B=\{I_{p+1}, I_{p+2}, \ldots I_q\}$ of items in I, where the subset A and the subset B are disjunct, that is, have no common elements. An association rule is an implication of the form $A \rightarrow B$, that is, $\{I_1, I_2, \ldots I_p\} \rightarrow \{I_{p+1}, I_{p+2}, \ldots I_q\}$, between the subset A and the subset B. The subset A of items is called the body and the subset B of items the head of the rule. To select interesting rules from the set of all possible rules, constraints on various measures of significance and interest can be used. The best-known constraints are minimum thresholds on support and confidence. The support supp(A) of an itemset A is defined as the proportion of transactions in the data set which contain the itemset A. The confidence of a rule $A \rightarrow B$ is defined conf($A \rightarrow B$)=supp(S)/supp(A), where S is the union set of items of the subset A and the subset B occurring in a transaction T in the transaction set D. This means that the association rule $A \rightarrow B$ holds true in the transaction set D with a confidence c, if c % of the transactions in D that contain the subset A of items also contain the subset B of items. In other words, the confidence is the conditional probability, $P(B|A)$, that is, the probability of the subset B occurring in a transaction T given the subset A occurs in the same transaction T. A user may define a minimum support or confidence for the rules, as very rare or loosely correlated events may not be of importance for some applications.

The following example describes an automotive company. The company has a large licensed dealer network. The dealers also offer repair shop services. The data concerning sales and defects are consolidated and transferred regularly to the automotive company. Different persons with different job roles regularly work with the data and perform analysis. Among such job roles are persons supporting the dealers or ensuring quality standards. These employees can execute analysis requests against the central data warehouse containing the data. Often employees request same or similar analysis. Therefore, caching of analysis results can significantly reduce response times and thus increase productivity.

The materialization criterion, that is, the decision procedure when the data mining model is written to the cache, is based on the cache storage limit, the data mining model quality, and the build time of the data mining model, and has been defined above. The system administrator specified for the data mining system the following parameters: CacheStorageLimit=9 MB, MinimumQuality=0.5, and MininimumBuildTime=10 minutes.

FIG. 8 shows a user request table 810 of data mining requests R1A, R1B, R2, R3A, and R3B. A task description table 820 contains data mining tasks, T0, T1, T2, and T3, which are stored in the cache when processing data mining requests. The data mining tasks have associated data mining models, M0, M1, M2, and M3. Their characteristics are stored in table 830 and are a basis for selecting data mining models to be stored in the cache. In response to a sequence of user requests, the descriptions of the data mining tasks, T0, T1, T2, and T3, in table 820 are subsequently stored in the cache together with the characteristics of associated data mining models, M0, M1, M2, and M3, in table 830.

In FIG. 9, table 910 shows materialization states for the data mining models at various steps of the sample scenario. The materialization state of each data mining model indicates whether the materialization state has not yet been determined (MATERIALIZE="-"), whether the data mining model could be stored in the cache (MATERIALIZE="YES" or "MAYBE") dependent on available storage space, or whether the data mining model could not be stored in the cache (MATERIALIZE="NO").

A sample scenario starts with only a data mining task description T0 and an associated data mining model M0 in the cache. The data mining type of the task T0 is Clustering. The data selection is performed on the customers table CUST with filter condition Filter=all. The data mining constraint is that the maximum number of clusters in the data mining model is MaxNum=5. The characteristics of the clustering data mining model M0 comprise the following properties: The data mining model quality is 0.9 or 90%. The build time of the data mining model, which is a measure of the data mining model complexity, is specified in minutes, for example, 20 minutes. The access count specifies how many times the data mining model has been hit by user requests, for example, 5 times. The access count can also be considered as an absolute request frequency. The size specifies the storage used in the cache to store the data mining model, for example, 5 MB or 5 Megabytes. The priority is calculated as a product of the data mining model size and the access count of user requests for the data mining model to be "25". The priority preferably has a unity measurement unit. Alternatively, the access count of the data mining model can be divided by the total number of user requests, which results in a relative access frequency and a modified priority. In step 911 of table 910, the materialization state for the data mining model M0 is set to MATERILAIZE=YES.

A delivery support team member wants to analyze defect parts replaced by his dealers in the Munich region to find frequent defect parts occurring together in customer orders. This may help him to bundle parts together for delivery. Therefore, he submits an association rule mining request R1A against the defect parts table DEFECTS for the dealers in Munich and specifies a minimum support of 10%. Since there is no same or more general task description in the cache, the task description T1 is stored in the cache. Then, the data mining model M1 is built based on data from the table DEFECTS with Filter=Munich.

FIG. 10 shows a possible data mining model M1, where three rules are found in table 1010 with a support higher than 10%. For example, Rule 1 in line 1011 describes an association between two defect parts of a car, a cylinder head gasket and an ignition plug. This rule has a support of 24% and a confidence of 68%. The remaining rules in lines 1012 and 1013 correlate other combinations of defect parts. The data mining model quality is calculated as the confidence average of rules found, that is, 76%, as shown in line 1014. For the data mining model M1, this quality and the build time of 15 minutes are both greater than the thresholds defined by the system administrator. Therefore, the data mining model is temporarily stored in the cache. Since the 5 Megabytes of the model M0 and the 2 Megabytes of the model M1 do not exceed the cache storage limit of 9 Megabytes, no data mining models have to be deleted from the cache. In step 912, the materialization state of the model M1 is set to MATERIALIZE=YES. The access count for the data mining model M1 is set to "1" and the priority is calculated to be "2". The data mining model M1 is returned to the support team member. The insight from the rules helps him to offer useful combinations of associated spare parts to the dealers.

A quality assurance team member needs to carry out a similar analysis, based on the same defect parts data, but for a different purpose. To investigate whether a defect in a certain part causes another part to break, he is interested in defect parts occurring together in spare part orders. He expects to recognize the root parts causing most defects, so they can be investigated and possibly redesigned. For this purpose, he also submits an association rule data mining request R1B against the defect parts table DEFECTS for the Munich dealers and specifies a minimum support, MinSupp=20%. This data mining request R1B is mapped onto the data mining task description T1, which already exists in the cache with a minimum support, MinSupp=10%, and thus is more general than the data mining request. The data mining model M1 stored in the cache is associated with the data mining task T1. For the request R1B, the data mining system can extract a sub-model from the data mining model M1. The sub-model comprises all rules where minimum support is 20%, that is, only Rule 1 and Rule 2 in lines 1011 and 1012. The support of Rule 3 in line 1013 is below 20% and is excluded from the sub-model. The access count of the data mining model M1 is incremented to "2" and the priority value is re-calculated to be "4". The determined sub-model is returned to the requesting user who benefits from a shorter response time and can right away start with the examination of the results. He may suggest his colleagues to investigate problems regarding the cylinder head gasket and the steering shaft in order to avoid respective problems with the ignition plug and the steering skew gear.

A further support team member is responsible for dealers in the region of Stuttgart. He wants to carry out a similar analysis on defect parts, but with a filter condition Filter=Stuttgart and submits a corresponding data mining request R2. Even though the table DEFECTS is the same as for the data mining task T1, the filter condition is different and the stored data mining model M1 cannot be re-used in this case. Therefore, a new data mining task description T2 may be stored in the cache and the associated data mining model M2 is built. Since the data mining model quality of M2 is 40% and lower than the minimum quality of 50% defined by the system administrator, the model M2 is not cached. The materialization status of the model M2 is set to MATERIALIZE=NO in step 913. The determined data mining model M2 is not stored for further use, only returned to the requesting user. It is possible that the data mining task description T2 is not stored in the cache at all or removed from the cache when the data mining model is not stored.

A further quality assurance team member wants to carry out an analysis R3A for dealers in the Berlin area as his colleague previously did for the dealers in the Munich region. A new data mining task definition T3 is stored in the cache and the data mining model M3 is built. Since both the quality and the response time are greater than the thresholds defined by the system administrator, the data mining model M3 is planned to be stored in the cache. However, the sum (namely 10 MB) of the sizes of the data mining models, M1, M2, and M3, exceeds the maximum storage limit (namely 9 MB). In this case, the priorities of all models in the cache are compared (namely 25 for M0, 4 for M1, and 3 for M3). The models with the lowest priorities are removed from the cache until the sum of the sizes falls below the maximum storage limit. In this case, the data mining model M3 is not stored in the cache and its materialization status is updated to MATERIALIZE=MAYBE in step 914. The corresponding data mining task description T3 and the characteristics of the data mining model M3 may however remain in the cache. Finally, the determined association rules data mining model M3 is returned to the requesting user.

A yet further quality assurance team member also wants to carry out a similar analysis R3B on defect parts for dealers in the Berlin area, but with a higher minimum support MinSupp=20%. For this request, a more general data mining task description T3 can be found in the cache with MinSupp=10%. The already existing data mining task description T3 is used for the request R3B. The stored data mining quality and build time are sufficiently high for allowing storing the data mining model M3 in the cache. But the associated data mining model M3 does not exist in the cache and needs to be rebuilt. The quality and build time of the data mining model M3 usually remain unchanged. Its access count is incremented to "2" and its priority is re-calculated to become "6". Since the storage limit would again be exceeded because 10 MB is greater than 9 MB, the data mining models with the lowest priorities are removed from the cache. In this case, the model M1 with priority "4" is removed from the cache, whereas the model M3 with priority "6" is stored in the cache. In step 915, the materialization status for the data mining model M1 is set to MATERIALIZE=MAYBE and for the data mining model M3 the materialization status is set to MATERIALIZE=YES. Finally, the model M3 is returned to the requesting user.

Figure 11:
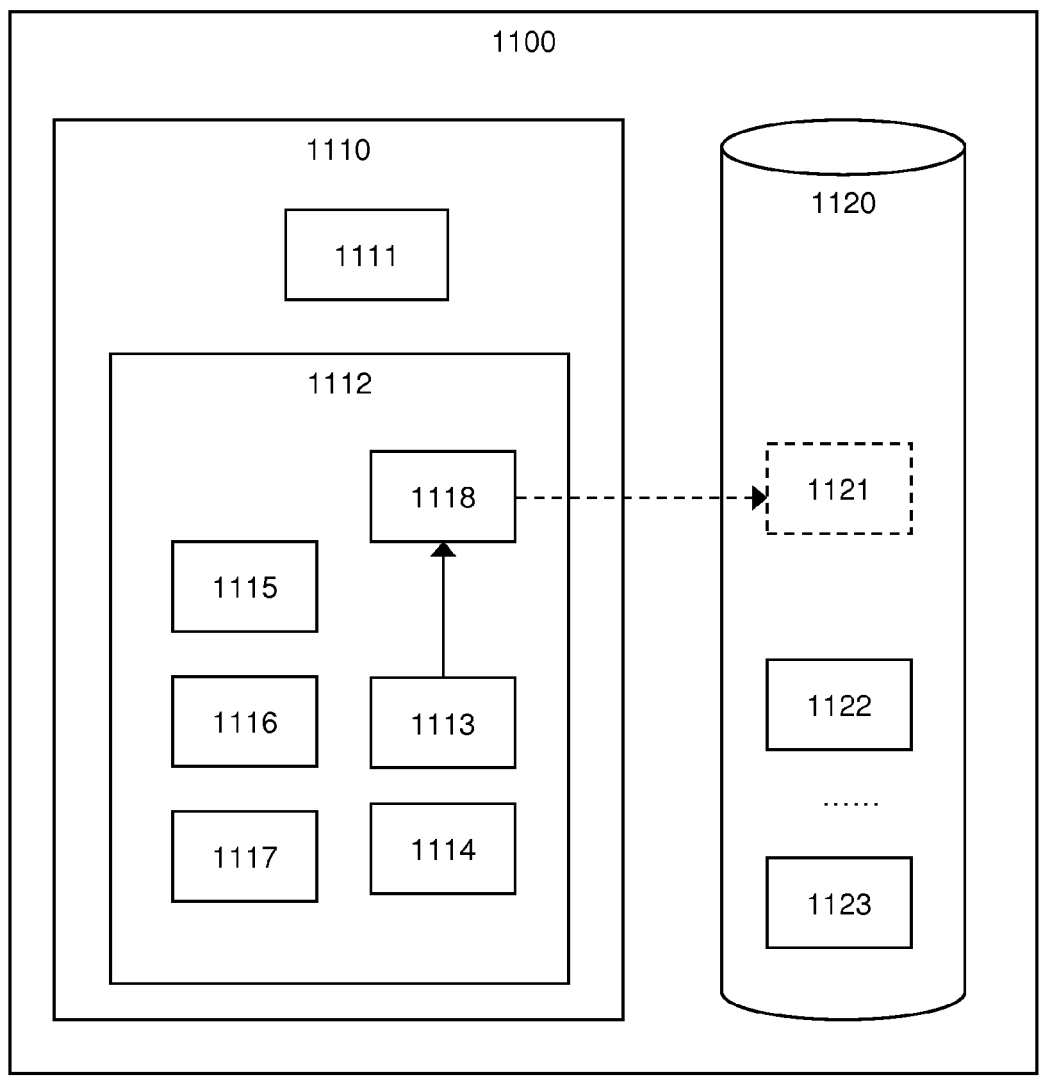
FIG. 11 illustrates a block diagram of a first data processing system for storing of data mining models according to an embodiment of the present invention.

FIG. 11 illustrates a block diagram of a data processing system 1100 for storing of data mining models. The data processing system comprises a data processor or data processing means 1110 and storage means 1120 for storing of data mining models, 1121, 1122 and 1123. The data processing means includes a processor 1111 and a memory 1112. The processor stores program code portions, 1113, . . . , 1117, in respective elements of the memory and executes these program code portions as follows: According to first program code portions 1113, the processor creates a first data mining model 1118 having at least one of the following data mining model characteristics: quality and complexity. According to second program code portions 1114, the processor handles the first data mining model as a candidate for storing in the storage means if a criterion for the characteristics is met. According to third program code portions 1115, the processor determines whether the sum of the size of the first data mining model 1118 and the sizes of further data mining models already stored in the storage means, 1122, . . . , 1123, exceeds a storage limit According to forth program code portions 1116, if the storage limit is not exceeded. The data processing means stores the first data mining model 1121 in the storage means. According to fifth program code portions 1117, if the storage limit is exceeded, the data processing means decides based on priorities of the first data mining model and the further data mining models which data mining models to store in the storage means. The priorities are dependent at least on access frequencies of the respective data mining models.

Figure 12:
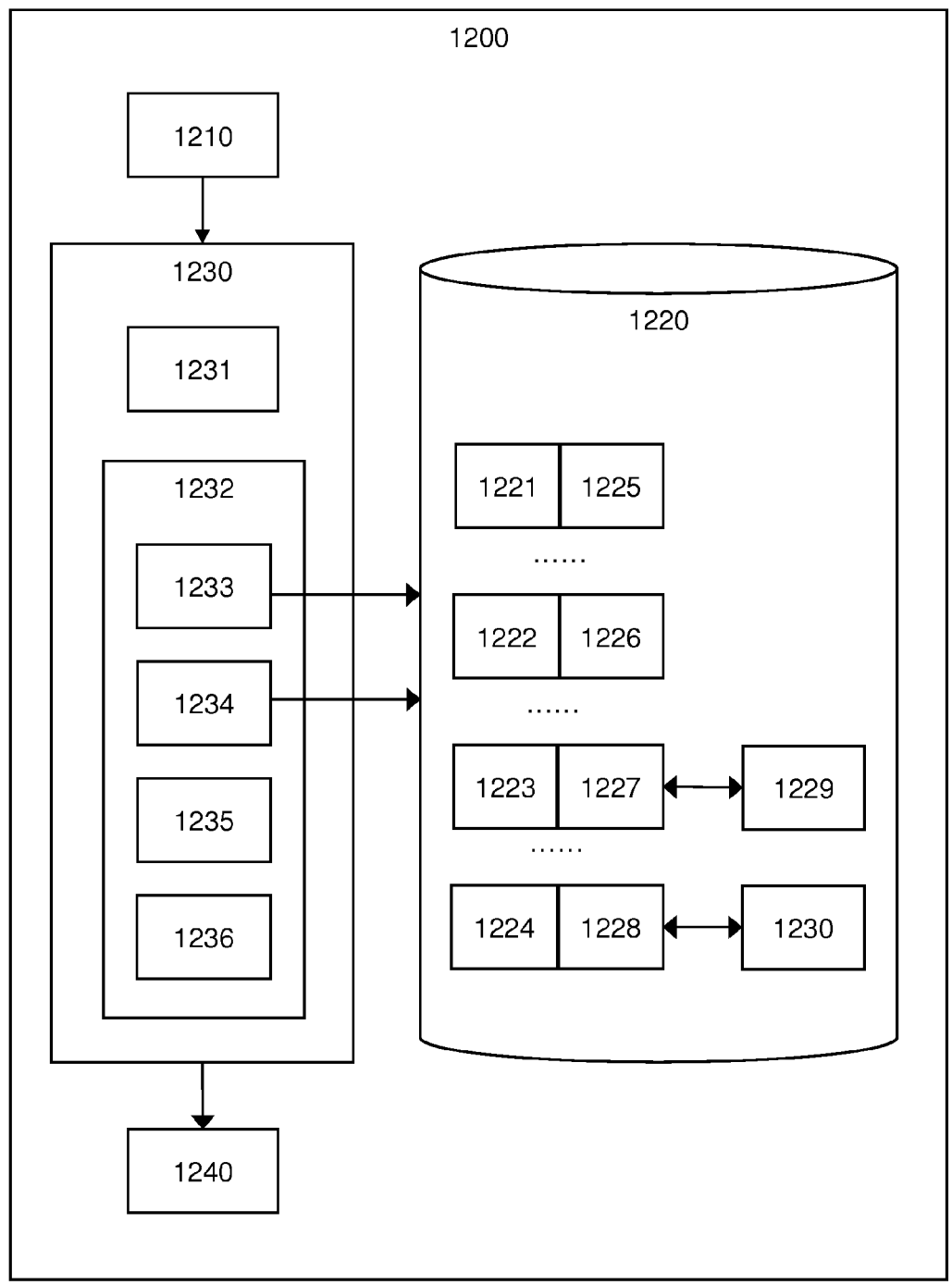
FIG. 12 illustrates a block diagram of a second data processing system for storing of data mining models according to an embodiment of the present invention.

FIG. 12 illustrates a block diagram of a data processing system 1200 for storing of data mining models. The data processing system comprises an input device or input means 1210, a storage device or storage means 1220, a data processor or data processing means 1230, and an output device or output means 1240. The input means receives a new data mining request. The storage means stores data mining models information, 1221, . . . , 1224, identifying a data mining model and information, 1225, . . . , 1228, describing data mining model quality. The data processing means includes a processor 1231 and a memory 1232. The processor stores program code portions, 1233, . . . , 1236, in respective elements of the memory and executes these program code portions as follows: According to first program code portions 1233, the processor stores in the storage means the data mining models information identifying a data mining model and the information describing data mining model quality. According to second program code portions 1234, the processor stores in the storage means data mining models, 1229, . . . , 1230, having data mining model quality, 1227, . . . , 1228, fulfilling a first predefined criterion. According to third program code portions 1235, the processor determines a data mining model for the new data mining request and checks if information, 1225, . . . , 1228, describing data mining model quality for the data mining model has been stored in the storage means. According to forth program code portions 1236, the processor initiates a request to a user to confirm that data mining is to proceed if data mining model quality of the data mining model does not fulfill a second predefined criterion. The output means submit the request to the user.

In alternative embodiments of the present invention, other quality criteria for the data mining models can be specified. In association rule data mining, alternative measures of interesting features may be used to define qualities of data mining models, for example, "conviction", "lift", and others. Example details are provided at the URL http://en.wikipedia.org/wiki/Association_rule_learning. The "conviction" of a rule A→B can be interpreted as the ratio of the expected frequency that the subset A occurs without the subset B. The "lift" of a rule is defined as the ratio of the observed confidence to that expected by chance. Further restrictions may be applied to the rule selection, which may be included in the quality definition, for example, weights (cost, price) of rules, constraints on rule length, and positive or negative item constraints. The "length" of a rule A→B depends on the number of items in the subsets A and B.

The quality of data mining models is usually represented as comparable numerical values, for example, 0.1 for low quality and 0.9 for high quality. Alternatively, string elements of a sorted list may be used instead, for example, ["bad", "medium", "good"], where the list position indicates a measure of quality.

A data mining model complexity may be based on other parameters than model build time, for example, a number of data mining model items.

The materialization criterion is not limited to data mining model quality and data mining model complexity and may consider further properties of data mining models.

The priority calculation is not restricted to a product of access count and storage size of the data mining model. Other combinations of the four data mining model characteristics (size, quality, access count, build time) can also be considered, or even other model properties may be taken into account. This may be a data mining model size that is calculated based on other data mining model properties than storage consumption.

The formulas for the materialization criterion and the priority calculation may also be dynamically changed for different data mining request patterns. In some scenarios, a model response time can be more important than a model quality. Other scenarios may focus on other user needs.

Sequences data mining uses support and confidence measures for rules of items, which allow to define quality values in a similar way as association rule mining.

The surjective mapping of the data mining requests onto data mining tasks, the bijective mapping of data mining tasks onto data mining models, the user dialogs, and the building of the associated data mining models may be carried out in the same data processing system. Alternatively, some of the steps may be performed, for example, in different data processing systems, which requires a transfer of the generated information, for example, by transmission over a network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Example embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computer-implemented method for storing of data mining models, the method comprising:
    creating a first data mining model having at least one of the following characteristics: quality and complexity;
    determining whether the first data mining model is a candidate for storing in a storage device in response to a criterion for the characteristics being met;
    determining whether the sum of the size of the first data mining model and sizes of further data mining models already stored in the storage device exceeds a storage limit;
    in response to the storage limit not being exceeded, storing the first data mining model in the storage device;
    in response to the storage limit being exceeded, determining, based upon priorities of the first data mining model and the further data mining models, which data mining models to store in the storage device, the priorities being dependent at least on access frequencies of the respective data mining models;
    providing a surjective (N-to-1) mapping from data mining requests onto data mining tasks;
    providing a bijective (1-to-1) mapping from data mining tasks onto data mining models, wherein a data mining task includes an associated data mining model;
    storing for each stored data mining model a respective task description; and
    upon receiving a new data mining request, determining based on the surjective and bijective mappings whether a data mining model associated with the new data mining request is already stored in the storage device.

2. The method of claim 1, further comprising post-processing the data mining model associated with the new data mining request.

3. The method of claim 1, further comprising storing for the first data mining model information identifying the first data mining model and information describing the first data mining model characteristics.

4. The method of claim 1, wherein a data mining model comprises a set of data patterns, a data pattern having an associated pattern property determined by the data mining task, and wherein the data mining quality of the data mining model is calculated based on the pattern properties.

5. The method of claim 1, wherein the data mining model complexity is determined based on a build time of the data mining model.

6. The method of any claim 1, further comprising:
   calculating a priority of a data mining model based at least on one of the following characteristics: access frequency, storage size, build time, and quality; and
   removing from the storage device already stored data mining models based at least on the priorities of the already stored data mining models.

7. The method of claim 1, wherein the surjective mapping comprises comparing data mining requests and data mining tasks based on data selection constraints and data mining constraints.

8. A data processing system for storing of data mining models, the system comprising:
   a storage device to store data mining models; and
   a data processor configured to:
      create a first data mining model having at least one of the following characteristics: quality and complexity;
      determine whether the first data mining model is a candidate for storing in the storage device in response to a criterion for the characteristics being met;
      determine whether the sum of the size of the first data mining model and sizes of further data mining models already stored in the storage device exceeds a storage limit;
      in response to the storage limit not being exceeded, storing the first data mining model in the storage device;
      in response to the storage limit being exceeded, determining, based upon priorities of the first data mining model and the further data mining models, which data mining models to store in the storage device, the priorities being dependent at least on access frequencies of the respective data mining models;
      provide a surjective (N-to-1) mapping from data mining requests onto data mining tasks;
      provide a bijective (1-to-1) mapping from data mining tasks onto data mining models, wherein a data mining task includes an associated data mining model;
      store for each stored data mining model a respective task description; and
      upon receiving a new data mining request, determine based on the surjective and bijective mappings whether a data mining model associated with the new data mining request is already stored in the storage device.

9. The system of claim 8, wherein the data processor is further configured to post-process the data mining model associated with the new data mining request.

10. The system of claim 8, wherein the data processor is further configured to store for the first data mining model information identifying the first data mining model and information describing the first data mining model characteristics.

11. The system of claim 8, wherein a data mining model comprises a set of data patterns, a data pattern having an associated pattern property determined by the data mining task, and wherein the data mining quality of the data mining model is calculated by the data processor based on the pattern properties.

12. The system of claim 8, wherein the data mining model complexity is determined by the data processor based on a build time of the data mining model.

13. The system of claim 8, wherein the data processor is further configured to:
   calculate a priority of a data mining model based at least on one of the following characteristics: access frequency, storage size, build time, and quality; and
   remove from the storage device already stored data mining models based at least on the priorities of the already stored data mining models.

14. The system of claim 8, wherein the surjective mapping by the data processor comprises comparing data mining requests and data mining tasks based on data selection constraints and data mining constraints.

15. A computer program product for storing of data mining models, the computer program product comprising a computer readable storage medium having computer usable program code embodied therewith, the computer usable program code being configured to:
   create a first data mining model having at least one of the following characteristics: quality and complexity;
   determine whether the first data mining model is a candidate for storing in a storage device in response to a criterion for the characteristics being met;
   determine whether the sum of the size of the first data mining model and sizes of further data mining models already stored in the storage device exceeds a storage limit;
   in response to the storage limit not being exceeded, store the first data mining model in the storage device; and
   in response to the storage limit being exceeded, determine, based upon priorities of the first data mining model and the further data mining models, which data mining models to store in the storage device, the priorities being dependent at least on access frequencies of the respective data mining models;
   provide a surjective (N-to-1) mapping from data mining requests onto data mining tasks;
   provide a bijective (1-to-1) mapping from data mining tasks onto data mining models, wherein a data mining task includes an associated data mining model;
   store for each stored data mining model a respective task description; and
   upon receiving a new data mining request, determine based on the surjective and bijective mappings whether a data mining model associated with the new data mining request is already stored in the storage device.

16. The computer program product of claim 15, wherein a data mining model comprises a set of data patterns, a data pattern having an associated pattern property determined by the data mining task, and wherein the data mining quality of the data mining model is calculated by the computer readable program code based on the pattern properties.

17. The computer program product of claim 15, wherein the data mining model complexity is determined by the computer readable program code based on a build time of the data mining model.

* * * * *